United States Patent [19]

Walker

[11] Patent Number: 5,019,755
[45] Date of Patent: May 28, 1991

[54] ELECTRIC MOTOR DRIVE SYSTEM

[76] Inventor: David E. Walker, #90 1055 Shawnmarr Road, Mississauga, Ontario, Canada, L5H 3V2

[21] Appl. No.: 487,845

[22] Filed: Mar. 5, 1990

Related U.S. Application Data

[63] Continuation-in-part of Ser. No. 336,139, Apr. 11, 1989, abandoned.

[51] Int. Cl.$^5$ .......................................... H02K 17/34
[52] U.S. Cl. ........................................ 318/13; 318/15; 318/46; 318/72; 318/102; 318/8; 310/112
[58] Field of Search ........................................ 318/8–15, 318/34, 45, 46, 48, 49, 52, 67, 68, 72, 77, 86, 102, 111, 112, 113; 310/112

[56] References Cited

U.S. PATENT DOCUMENTS

| | | |
|---|---|---|
| 2,436,582 | 2/1948 | Lear . |
| 2,436,936 | 3/1948 | Page . |
| 2,685,350 | 8/1954 | Falk . |
| 3,498,569 | 3/1970 | Kjos . |
| 3,559,008 | 1/1971 | Stut et al. . |
| 3,861,485 | 1/1975 | Busch .............................. 318/11 X |
| 3,950,686 | 4/1976 | Randall ............................ 318/45 X |
| 3,959,699 | 5/1976 | Brail ................................. 318/45 |
| 4,354,144 | 10/1982 | McCarthy ............................ 318/13 |
| 4,525,655 | 6/1985 | Walker . |
| 4,594,652 | 6/1986 | Mattson ............................ 318/46 X |
| 4,788,476 | 11/1988 | Ginier ................................ 318/45 X |

Primary Examiner—Bentsu Ro

[57] ABSTRACT

An electric motor drive system having a first electric motor, a first drive shaft to which the first electric motor is coupled, a second electric motor having a higher power rating than the first, a second drive shaft to which the second electric motor is coupled, an epicyclic gear system comprising a sun gear to which the first drive shaft is coupled, a ring gear to which the second drive shaft is coupled, and planetary gears meshing with both the sun gear and the ring gear, an output drive coupled to the planetary gears, and, a one-way rotation restraining means coupled to the second shaft to permit rotation of the second shaft in one direction and to prevent rotation of the second shaft in the other direction for restraining motion of the second shaft during start up of the first motor, and a one-way rotation restraining means coupled to the first drive shaft for restraining rotation of the first shaft during start up of the second motor, and clutch means operable to interconnect said first and second motors, durhg starting of one of said motor, to cause initial rotation of the other of said motors, and a method of operating such an electric motor drive system.

10 Claims, 3 Drawing Sheets

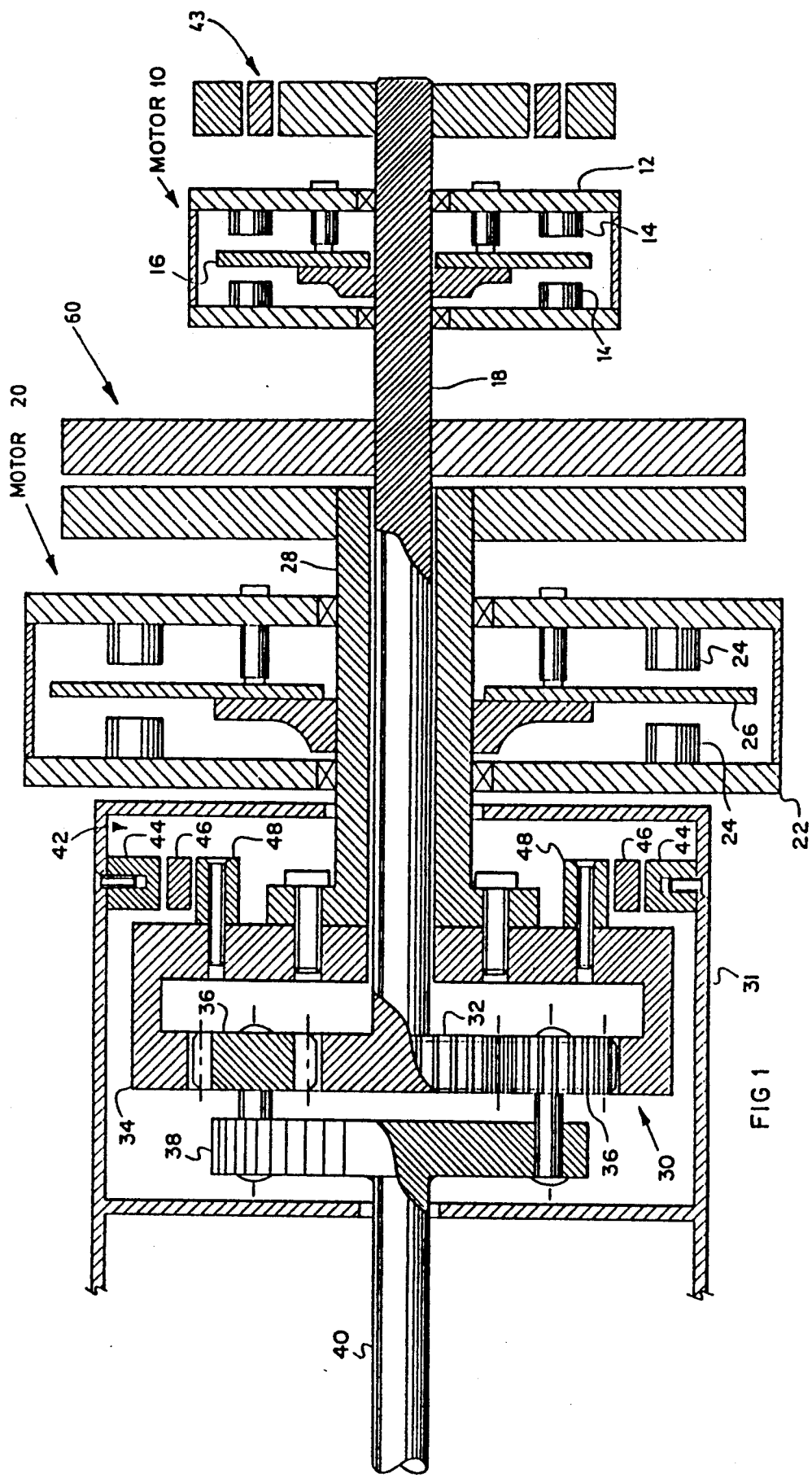

ELECTRIC MOTOR DRIVE SYSTEM

This Application is a continuation-in-part of Application Ser. No. 336,139—MULTI-STAGE ELECTRIC DRIVE, Inventor—David E. Walker, Filed—Apr. 11, 1989, now abandoned

BACKGROUND OF THE INVENTION

It is well known that the power consumption for any given electric motor, during acceleration, and especially during acceleration from zero, is much greater than the power consumption required for steady state operation. The operation of such electric motors under conditions requiring repeated start-stop functions therefore involves a somewhat excessive power consumption.

Numerous attempts have been made to reduce this excessive power consumption during start-up, or acceleration from zero. One approach has been to provide an electric motor having an armature with multiple windings which may be connected or disconnected at various speeds.

Other systems employ two or more separate windings, but with only limited success. Another approach altogether has been to provide for a two-speed operation, for example in elevator and hoist motors, where a slow and fast operation is required, by providing what are in effect two separate electric motors, with armatures actually fastened to the same shaft, in tandem.

However, such systems are of somewhat limited utility, and only provide for a very limited improvement over the use of a single motor.

An improved system is described in U.S. Pat. No. 4,525,655 entitled "Two Stage Electric Drive", invented by David E. Walker.

In this system two electric motors of different horsepower ratings are connected through an epicyclic gear train. A one-way rotational restraining device is placed on the portion of the drive train connected to the larger motor. The system operates, under acceleration, with the smaller motor starting first, and through a reducing drive in the epicyclic gear train, applies power to a drive shaft. Once a predetermined speed is reached, the second motor is started up, and the two motors are eventually operated at the same speed, providing a direct one-to-one drive to the drive shaft. During the first acceleration phase when the smaller motor is operating, the epicyclic gear train and the second motor are prevented from moving in the reverse direction by means of the one-way restraining device.

This system produces considerable advantages, in reducing the peak power consumption during acceleration which is normally experienced with electrical motors. Even with this improved system however there were still peaks occurring about the time the second or larger motor was started up, although such peaks were not as high as would have been the case in an ordinary electric motor.

Other problems arise in the use and operation of electrical motors, particularly large electrical motors. It is well known that electrical motors operate at maximum efficiency at their highest designed speed. They also operate most efficiently when the load applied to the motor is a steady state load. However, it frequently occurs that large electric motors are used in situations where the load is variable or intermittent. In these cases, there is considerable difficulty in controlling the electrical motor, when the load drops, and is considerable excess power consumption as a result. Complex controls are used to overcome this problem.

It is clearly desirable from a viewpoint of economy, and flexibility to provide an electric drive system which is capable of providing smooth continuous acceleration from zero, up to a desired maximum, and in which peaks in power consumption, are minimized, and at the same time providing such advantages within a reasonable cost.

Furthermore, it is clearly desirable to provide an electric drive system which is capable of operating under variable load conditions, with a high degree of efficiency, and with a reduced power consumption as compared with conventional electric motors.

BRIEF SUMMARY OF THE INVENTION

The invention, therefore, comprises an electric drive system comprising a first electric motor having a predetermined power rating, a first drive shaft to which said motor is connected, a second electric motor having a predetermined power rating, a second drive shaft to which said second motor is connected, an epicyclic gear train system comprising a sun gear, said first shaft being connected to said sun gear for driving the same, and further comprising a ring gear, said second shaft being connected to said ring gear for driving the same, and a plurality of planetary gears meshing with said sun gear and said ring gear, and output drive means coupled to said planetary gears and adapted to be driven thereby, and, first one-way rotation restraining means coupled to said ring gear for restraining rotation of the same in one direction, while permitting free rotation of the same in the opposite direction in response to driving of said second motor, second rotation restraining means coupled to the first drive shaft for restraining motion of the first motor during start up of the second motor, and clutch means operable to transmit movement from a one of said motors to the other of said motors during start up of said other of said motors.

The invention also provides a method of operating an electric drive system having the foregoing features.

It is a further and related objective of the invention to provide a method of operating an electric drive system of the type described, during conditions of variable load, by means of locking both shafts for co-rotation, and intermittently switching off one or other of said motors, to adjust to variations in said load.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a schematic illustration, consisting of a side elevation in section, showing an electric drive system according to the invention;

DESCRIPTION OF A SPECIFIC EMBODIMENT

Figure 4:
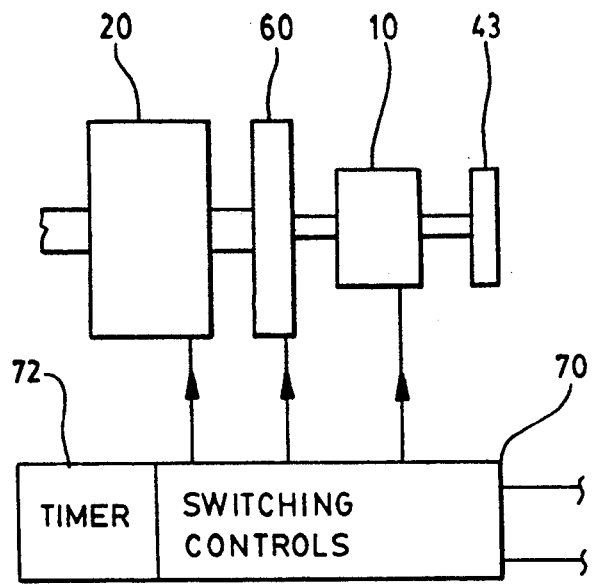
FIG. 4 is a schematic circuit diagram of an alternate control system.

As shown in the drawing, this preferred embodiment of the invention comprises a first motor indicated generally as 10, having a housing 12, carrying stators 14, the housing 12 being mounted on any suitable support (not shown), such as is well known in the art. An armature 16 is keyed to inner shaft 18 in driving relation thereto.

Motor 10 will have a predetermined rated horsepower, for example, it might be ¼ horsepower, which may be an A.C. or a D.C. motor of a suitable design.

A second larger motor 20 is also provided, having a housing 22, mounted on any suitable mounting or framework (not shown) such as is well known in the art. Within the housing 22 there are provided the usual stators 24, and an armature 26 coupled to shaft 28. Shaft 28 comprises a cylindrical sleeve member fitting around shaft 18 concentrically therewith, so that shaft 18 may be driven by motor 10 and shaft 28 by motor 20.

Motor 20 is preferably of a predetermined larger rated horsepower, for example, it might be ½ horsepower, i.e., double that of motor 10.

Obviously, such motors 10 and 20 will also incorporate the usual features found in such motors, for any particular application, the motors 10 and 20 being illustrated purely by way of example, and without any limiting characteristics, either as to horsepower, design, or A.C. or D.C. type.

In order to couple the two motors 10 and 20 together, shaft 18 and shaft 28 are both coupled to an epicyclic gear train system indicated generally as 30, in housing 31.

Shaft 18 is coupled to sun gear 32 of gear system 30, and shaft 28 is coupled to ring gear 34 of the same gear train system 30.

A plurality of planetary gears 36 running between the sun gear 32 and ring gear 34 are mounted on a common driven member 38 which is, in turn, connected to output drive means 40, typically being a drive shaft or the like.

In accordance with the invention, one-way rotational restraining means are provided for restraining rotation both of motor 10 and of motor 20, for purposes to be described below.

In order to restrain rotation of motor 20, rotation restraining means 42 are provided for holding the ring gear 34 against rotation in one direction, while permitting the same to rotate freely in the opposite direction in response to rotative power supplied by motor 20. Motor 10 is provided with a similar one-way rotation restraining means 43.

The one way rotation restraining systems may be of any suitable design, which may be essentially similar to a free wheel system.

In the illustration, the one-way rotation restraining system 42 is shown operating directly on ring gear 34. It will however be appreciated that this is purely by way of example. It could equally well operate on shaft 28, or some other member attached to shaft 28, or in any other way.

The rotation restraining system 42 comprises an outer ring 44 fastened to housing 31, an intermediate roller race 46, and an inner ramp ring 48, fastened to ring gear 34. Such a one-way restraining system is used commercially in transmissions, and is known as a "sprag clutch."

In whatever way such a one-way restraining system 42 is attached, the ring gear 34 is free for rotation only in one direction, in response to driving by motor 20. When motor 20 is idle, then ring gear 34 is incapable of rotation in the reverse direction, due to operation of the one-way restraining system 42.

In order to restrain the shaft 18 against reverse rotation, during startup of the second motor 20, the one-way rotation restaining device 43 is provided, which will typically be of a design similar to the rotation restraining device 42.

The restraining systems 42 and 43 are not normally provided with any operating means. They are essentially self-regulating, and automatic in function, in a manner well known in the art.

In order to provide still further advantages, clutch means 60 is provided, operating on shafts 18 and 28 between motor 10 and motor 20. The clutch means 60 will typically be in the form of an electromagnetic clutch of a type known per se, which is adapted to operate momentarily, and can then be released once more.

The clutch means 60 would be of the greatest benefit where relatively large motors are in use. In the case of smaller motors, it would not produce such major advantages. The reason for this is that in the case of larger motors, the actual mass of the rotor is so great that it represents a substantial inertial load, and substantial energy is required to start the rotor rotating. In smaller motors the rotor can be started more easily, although it still requires an excess of power.

As will be apparent from the following explanation, by the use of the clutch means 60, the momentum of one rotating motor can be applied momentarily to the other, stationary, motor, to give it, as it were, an initial boost to start it rotating. Once the stationary motor has started to rotate, then the electrical power being supplied to it for start-up will cause it to continue to accelerate in the normal way.

This will reduce the initial peak power consumption which would otherwise be required to overcome the inertia of the stationary motor.

Figure 2:
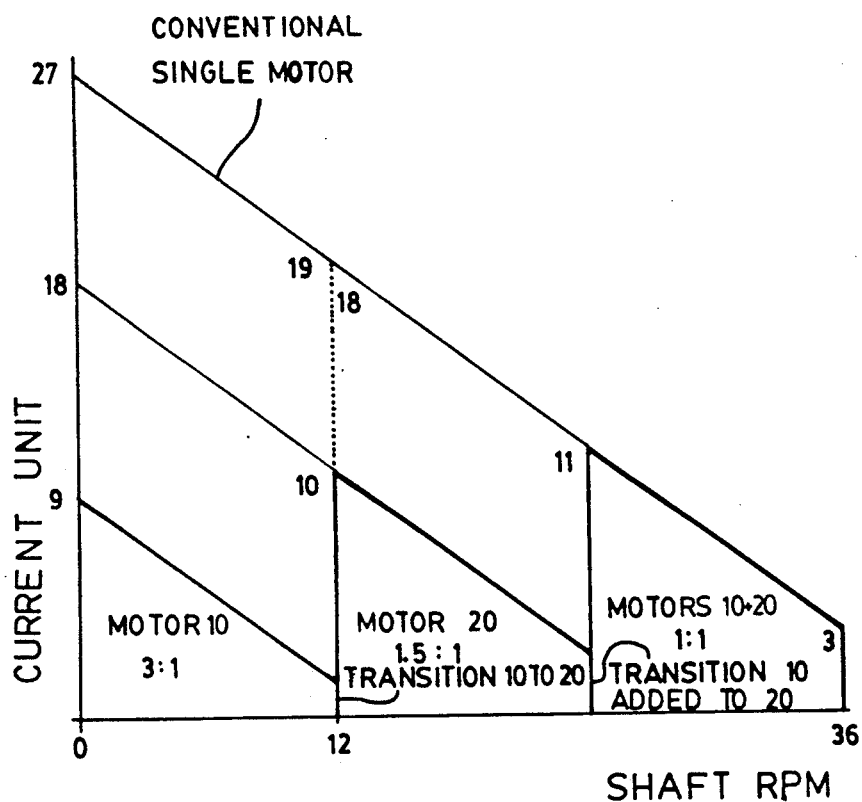
FIG. 2 is a graph showing the power consumption curves, of the first and second motors, during startup.
Figure 5:
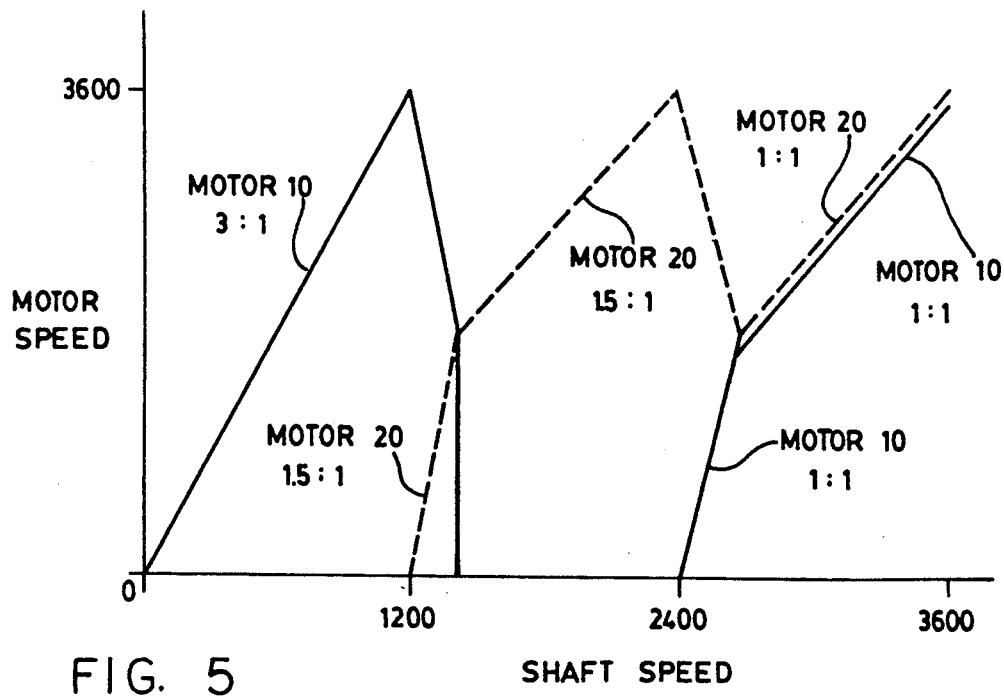
FIG. 5 is a graph showing the motor speeds during start-up.

In the preferred mode of operation, upon start-up from zero r.p.m., only motor 10 is operated (FIGS. 2 and 5). Power is applied to motor 10, which through shaft 18 commences rotation of sun gear 32. Initially the power requirement of motor 10 will be high relative to its consumption at its designed RPM, but will decrease rapidly, in accordance with a predetermined curve for that motor until an efficient rate of rotation is achieved. However, motor 10 is of relatively small power rating, and consequently the excess power consumption during this brief acceleration period is relatively small.

Rotaion of sun gear 32 will cause rotation of planetary gears 36, while ring 34 is held stationary by restraining system 42. By the provision of suitable gear ratios, the rotation of planetary gears 36 will cause rotation of output shaft 40, at approximately a 3:1 reduction as compared to the rate of rotation of shaft 18.

Accordingly, motor 10 on its own will provide for the initial acceleration from start-up, through the epicyclic gear system 10, with the mechanical advantage of the 3:1 reduction described.

Motor 10 will thus rapidly reach its maximum designed r.p.m. while producing acceleration up to a certain limited speed, with an economical use of the power available.

Once motor 10 is at its maximum r.p.m. or at least within an efficient range of operating r.p.m., depending of course upon the design of the motor itself, power to motor 10 is cut off, and clutch means 60 is momentarily activated.

The effect of this will be that the momentum of motor 10 is applied to motor 20, causing motor 10 to slow down and initiating rotation of motor 20. Clutch 60 is applied only momentarily and is then released again. After a very brief delay, power is supplied to motor 20. Since motor 20 is much larger, in fact having a rated power output approximately double that of motor 10, the power required for the initial start-up from zero r.p.m. of motor 20, if it were under load, would be much greater than that of motor 10. During this brief transitional period, the speed of the output shaft 40 will remain more or less constant, or will drop only slightly.

Motor 20 accelerates and motor 10 will soon cease to rotate, but the one-way rotational device 43 will prevent motor 10 from rotating in the reverse direction.

In this way the motor 20 accelerates initially under almost no load conditions, driving shaft 28, and causing rotation of ring gear 34 in the same direction to drive shaft 40. Rotation of ring gear 34 will cause rotation of planetary gears 36, which will rotate around sun gear 32 while sun gear 32 is held stationary.

In this mode of operation, the epicyclic gear train will produce an approximate reduction of about 1.5:1, as between the shaft 28 and the speed of shaft 40. Motor 20 can thus be accelerated up to its designed speed, within its efficient operating range, with a mechanical advantage of 1.5:1, and this will thus increase the speed of shaft 40.

As soon as motor 20 has reached a more efficient range of operating r.p.m. then power may be supplied to both motors 10 and 20 as desired.

Just before power is re-applied to the smaller motor 10, power may be momentarily cut off from the larger motor 20. Simultaneously the clutch means 60 is again operated. This will then transmit the momentum of the larger motor 20 to the smaller motor 10 which will then start rotating. As mentioned, this is a momentary function, and almost immediately the clutch means 60 will be released, and electrical power will be applied to motors 10 and 20 until the two motors are in synchronism. Power can then be increased, and acceleration continued with the two motors rotating in synchronism.

The power supplied to the two motors is so regulated as to bring them into synchronism so that they are both rotating at the same r.p.m. as soon as possible so that a condition is reached in which the entire epicyclic gear system 30 is rotating as a single unit, producing effectively a 1:1 drive relationship, with both shafts 18 and 28 rotating concentrically and at an r.p.m. identical to that of output shaft 40.

It will, of course, be appreciated that with the provision of suitable controls, motors 10 and 20 can be operated either in this mode, or in a variety of other modes depending upon the user requirements at the time. The mode described above, the preferred mode, may be simply expressed in following sequence:
1. Motor 10 alone, then,
   Motor 20 alone, then,
   Motors 10 and 20 together.

As mentioned, by the operation of suitable controls, it is possible that the operation be either:
2. Motor 10 alone, or,
3. Motor 20 alone, or,
4. Motors 10 and 20 together throughout from start-up.

As mentioned above, however, it is believed that the greatest advantages will be obtained by the preferred mode of operation (1) as described herein.

With reference to FIG. 2, typical anticipated load curves for the operation of motors 10 and 20 together, are illustrated. Also illustrated are the anticipated load curves, operating either motor 10 or motor 20 alone, on a direct one to one drive.

These curves are theoretical, and are not based on actual experimentation, and they do not take into account losses, whether mechanical losses or conversion losses, which would in fact be encountered in practice.

It will, however, be seen that the excessive peaks or steps of power consumption which would normally be experienced accelerating a single larger motor of a horsepower equal to the sum of motors 10 and 20, from zero to an efficient range of operating r.p.m. have effectively been reduced or smoothed out, and have been replaced by the relatively minor power consumption encountered during acceleration of motor 10 which is much smaller, followed by motor 20 alone from zero up to their efficient operating range.

At the same time, by arranging the gear ratios of the epicyclic gear system 30, together with the power outputs of the two motors, it is possible to achieve a system which can be operated at maximum power output for both motors, with the epicyclic gear system 30 effectively locked in unison, so that both motors are driving together.

Both motors of this type would normally have a designed r.p.m. which for smaller motors might be in the region of 3600 r.p.m. or more.

Larger motors might have a lower designed R.P.M., but the principles of the invention would be unchanged.

Motors of this type operate in an almost linear manner, over certain ranges of their performance, consuming relatively very high power requirements at low r.p.m. and then becoming rapidly and progressively more efficient at higher r.p.m.

It will be appreciated that particular advantages are obtained with D.C. motors, operating in a variable speed mode, such as in the operation of vehicles.

In FIG. 2, the curves plotted in respect of motors 10 and 20 are calculated curves. It will be appreciated that no allowance is made here for losses, for example, due to the use of a variable speed control, nor to losses arising out of transmission, friction, and the like. In addition, no adjustment has been made for current savings due to inertia transfer, in the manner described above.

It will also be appreciated that the use of the clutch means will produce the maximum advantages in the case of very large motors. Such very large motors cannot be started, under full power, from a stationary position. As is well known, such very large motors incorporate lower power windings, and a multi-stage control so that the rotation of the motor is initiated gradually.

It will thus be seen that the savings in peak power consumption are substantial leading to major advantages in the practical operation of such motors.

Figure 3:
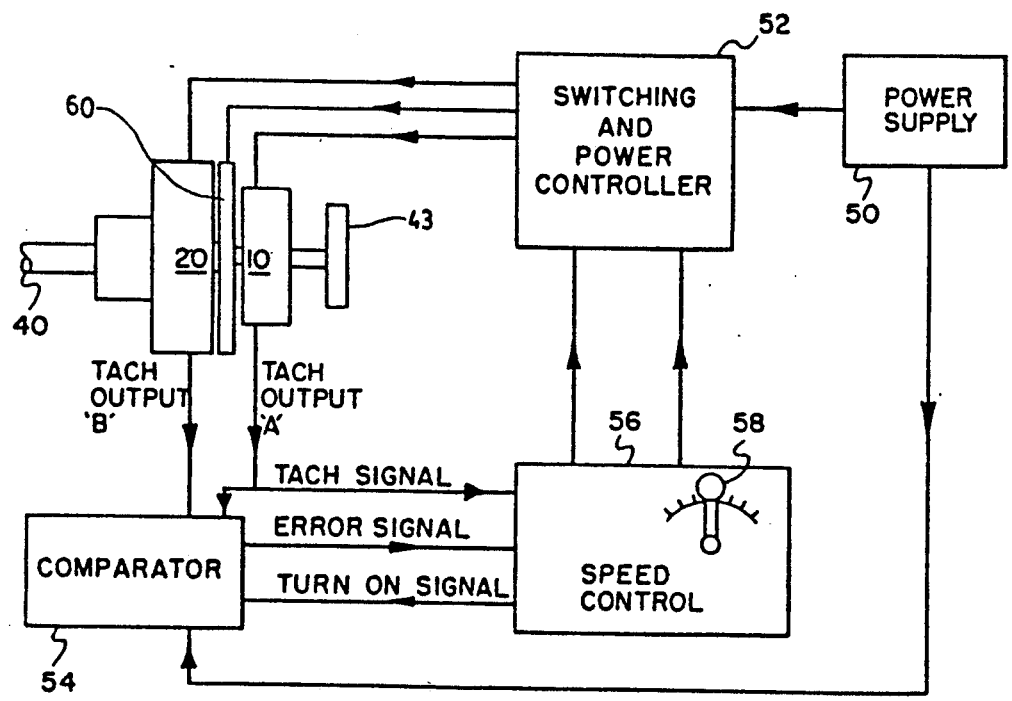
FIG. 3 is a schematic circuit diagram of the control system.

Various circuits and, in many cases, simple manual controls would suffice to provide the functions described above. In the case of larger capacity DC motors, a circuit that is particularly suitable for the purpose is disclosed in FIG. 3.

In this case, motors 10 and 20 are shown together with the gear train 30 and the output shaft 40.

Power is supplied from a power supply indicated generally as 50 which may be a series of storage cells or batteries, or any other suitable source of electric power. The power supply is connected through a switching and power control 52, directly to the motors 10 and 20.

The motors 10 and 20 are of the type incorporating suitable sensing devices for reading the r.p.m. of each motor in a manner well known in the art and requiring no further description.

The r.p.m. or tachometer output from each of the motors 10 and 20 is connected to a comparator circuit 54 which, in turn, is connected to a speed control 56. Speed control circuit 56 may be entirely automatic, and incorporating means for presetting various desired speeds. Alternatively, it may have a variable speed manual or other control 58, similar to an accelerator pedal in, for example, an electrically powered vehicle.

Power is supplied for the operation of the speed control and the comparator from the power supply 50.

In addition, a further connection is made between the tachometer signal of the motor 10 and the speed control 56.

In the operation of this circuit, initial operation of the speed control 58 will cause power control 52 to supply power to a motor 10. Motor 10 will then accelerate rapidly up to its efficient operating r.p.m., and a tachometer or r.p.m. signal will be delivered from motor 10 to speed control 56 and also to comparator 54.

As soon as speed control 56 receives a signal indicating a desired level of r.p.m. in motor 10, it then automatically signals comparator 54 to begin comparing the tachometer or r.p.m. signals from motors 10 and 20.

When motor 20 is not operating, there will be a large error signal generated in the comparator 54 which will then be communicated to the speed control 56. This will then cause switching and power control 52 to cut off power supplied to motor 10 and supply power to motor 20 in proportion, and to operate clutch means 60.

The two r.p.m. signals will then rapidly change until motor 10 has stopped, and motor 20 is at its designed r.p.m.

Clutch 60 will then be operated again, and power will be supplied to motor 10, and cut off momentarily from motor 20, and then re-supplied.

The two r.p.m. signals will then rapidly come into synchronism so that the error signal is reduced to zero, causing appropriate signals from speed control 58 to, in turn, cause switching and power control 52 to provide balanced power to both motors 10 and 20.

The speed balancing control system is designed to ensure unity in variance speed applications because the two motors and the gear train will automatically load-share provided the motors remain within their ratings.

In the case of AC motors, a simpler form of control system, as shown in FIG. 4, would be adequate. In this case, the motors 10 and 20 are connected through switching control 70, to the main power supply. Typically, in AC motors full power is applied from start-up. In the case of the present invention, full power would be applied to the smaller motor 10, bringing it rapidly up to its efficient RPM. Switching control 70 would incorporate a simple form of timer 72, which would then shut off motor 10 and apply full power to motor 20, and operate the clutch means 60 bringing it up to speed, after which full power would then be applied to both motors 10 and 20.

While the above description and explanation have dwelt principally on the start-up phase of the operation of the electric drive system, it will also be appreciated that the invention has significant advantages to offer in the area of continuous operation. The operation of a single large electric motor, under conditions of varying load, presents significant problems in the controlling of the power supplied to the motor so that the power supplied essentially matches the load.

By the use of the invention, these problems can be significantly reduced. Thus when the two motors 10 and 20 are operating at full speed, both operating at their designed R.P.M., at a 1:1 ratio, so that the shaft speed is also the same speed as the motor, they are capable of handling the maximum load for which that electric drive system has been designed. However, in the event that the load drops, then some substantial degree of load matching can be achieved by simply locking the clutch 60, so that both shafts 18 and 28 are locked to rotate in unison, and then shutting off either the smaller motor 10 or the larger motor 20, depending upon the magnitude of the load variation.

In this way, it is possible to provide an electrical drive system which will maintain its full output shaft speed, but in which it is possible to operate on one third power, or two thirds power, or full power, simply by switching in or out one or the other of the electric motors. This solution to the load-matching problem is much simpler and more economical than the complex control systems presently in use with a single large electric motor. In this way, the maximum savings are achieved both during start-up, and during steady state running under intermittent load.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An electric motor drive system which comprises:
   a first electric motor having a predetermined power rating;
   a first drive shaft to which said first electric motor is drivingly coupled;
   a second electric motor having a predetermined power rating higher than said first motor;
   a second drive shaft to which said second electric motor is drivingly coupled;
   an epicyclic gear system in turn comprising:
   a sun gear to which said first drive shaft is drivingly coupled for rotation in a forward direction;
   a ring gear to which said second drive shaft is drivingly coupled for rotation in said forward direction;
   a plurality of planetary gears meshing with both said sun gear and said ring gear;
   an output drive coupled to said planetary gears for conjoint rotation therewith about said sun gear;
   first one-way rotation restraining means operatively coupled to said ring gear and restraining rotation of said ring gear in a reverse direction only, said first one-way rotation restraining means permitting free rotation in said forward direction whereby said ring gear is free to rotate in said forward direction under the influence of said second motor;
   second one-way rotation restraining means operatively coupled to said first drive shaft for restraining rotation thereof in a reverse direction while permitting free rotation in the forward direction;

clutch means operable to lock said shafts together whereby to apply motion of one said motor, to the other said motor, and, control means for selectively supplying electrical power to one or the other or both of said motors, and for operating said clutch means.

2. An electric motor drive system as claimed in claim 1 wherein said control means comprises:

a first tachometer operatively coupled to said first electric motor and operative to provide a first speed signal indicative of the speed of rotation of said first electric motor;

a second tachometer operatively coupled to said second electric motor and operative to provide a second speed signal indicative of the speed of rotation of said second electric motor;

a comparator operatively connected to said first and second tachometers and adapted to compare said first and second speed signals and to provide an error signal indicative of the difference between said first and second speed signals;

a switching and power controller operatively connected to said first and second electric motors and operative individually to control the power supply to each of said first and second electric motors, and, a speed controller operatively connected to said first tachometer, to said comparator and to said switching and power controller and operative to:

permit the supply of power to said first electric motor by said switching and power controller;

provide a signal to said comparator to actuate said comparator when the speed of said first electric motor attains a predetermined value;

receive the error signal from said comparator indicative of the difference between said first and second speed signals, and, provide a control signal to said switching and power controller to cause said switching and power controller to supply power to said second electric motor and to reduce the power supply to said first electric motor in such a way as to minimize said error signal.

3. An electric motor drive system as claimed in claim 2 and in which said speed controller additionally comprises independently operable speed control means.

4. An electric motor drive system as claimed in claim 1 and in which said second electric motor has a power rating relative to the power rating of said first electric motor of from about 1.5:1 to about 3:1.

5. An electric motor drive system as claimed in claim 4 and in which said second electric motor has a power rating relative to the power rating of said first electric motor of about 2:1.

6. An electric motor drive system as claimed in claim 1 and in which the gear ratios of said sun gear, said planetary gears, and said ring gear are such as to provide a 3:1 gear ratio between said first drive shaft and said output drive when said ring gear is stationary and a 1:1 gear ratio between said first and second drive shafts, and said output drive, when said first and second drive shafts are rotating at identical speeds.

7. An electric motor drive system as claimed in claim 1 wherein said second drive shaft is a hollow sleeve member, and said first drive shaft extends axially therethrough.

8. A method of operating an electric motor drive system which comprises:

a first electric motor having a predetermined power rating;

a first drive shaft to which said first electric motor is drivingly coupled;

a second electric motor having a predetermined power rating higher than said first motor;

a second drive shaft to which said second electric motor is drivingly coupled.

an epicyclic gear system, in turn, comprising:

a sun gear to which said first drive shaft is drivingly coupled for rotation in a forward direction;

a ring gear to which said second drive shaft is drivingly coupled in said forward direction, and, a plurality of planetary gears meshing with both said sun gear and said ring gear;

an output drive coupled to said planetary gears for conjoint rotation therewith about said sun gear;

first one-way rotation restraining means operatively coupled to said ring gear to prevent rotation of said ring gear in a reverse direction only, and being inoperative in said forward direction whereby said ring gear is free to rotate in said forward direction under the influence of said second motor;

second one-way rotational restraining means operatively coupled to said first drive shaft for restraining rotation thereof in a reverse direction while permitting free rotation in a forward direction;

clutch means operable to lock said shafts together whereby to apply motion of one said motor to the other said motor and which method comprises the steps of:

supplying electrical power to said first electric motor to cause rotation of said first drive shaft and said sun gear in said forward direction;

restraining said ring gear from rotating in said reverse direction by said first restraining means;

terminating supply of electrical power to said first electric motor;

momentarily operating said clutch means whereby to initiate rotation of said second electric motor;

subsequently supplying power to said second motor;

restraining reverse rotation of said first motor;

momentarily terminating supply of power to said second motor;

again momentarily operating said clutch means; and, subsequently supplying power to said first and second motors.

9. A method as claimed in claim 8 which further comprises the steps of comparing speed signals from first and second tachometers operatively coupled to said first and second electric motors respectively to provide an error signal indicative of the difference between the speeds of rotation of said first and second electric motors after such time as the speed of rotation of said first electric motor attains said predetermined power rating and controlling the supply of electrical power to said first and second electric motors in response to the magnitude of said error signal so as to minimize said error signal.

10. A method of operating an electric motor drive system which comprises:

a first electric motor having a predetermined power rating;

a first drive shaft to which said first electric motor is drivingly coupled;

a second electric motor having a predetermined power rating higher than said first motor;

a second drive shaft to which said second electric motor is drivingly coupled;

an epicyclic gear system, in turn, comprising:

a sun gear to which said first drive shaft is drivingly coupled for rotation in a forward direction;

a ring gear to which said second drive shaft is drivingly coupled in said forward direction, and, a plurality of planetary gears meshing with both said sun gear and said ring gear;

an output drive coupled to said planetary gears for conjoint rotation therewith about said sun gear;

a one-way rotation restraining means operatively coupled to said ring gear to prevent rotation of said ring gear in a reverse direction, and being inoperative in said forward direction whereby said ring gear is free to rotate in said forward direction under the influence of said second motor;

another one-way rotation restraining means operatively coupled to said first drive shaft for restraining rotation thereof in said reverse direction while permitting free rotation in said forward direction;

clutch means operable to lock said shafts together whereby to apply motion of one said motor or the other said motor to said output drive and which method comprises the steps of:

operating said first and second motors simultaneously at maximum design speed under full load;

operating said clutch means whereby to lock said shafts together for conjoint rotation, and, intermittently shutting off power to one or other of said motors, in the event of reductions in said load below said maximum load, whereby to achieve load matching.

* * * * *